(12) United States Patent
Fujiwara

(10) Patent No.: US 7,296,059 B2
(45) Date of Patent: Nov. 13, 2007

(54) DEVICE, METHOD, AND PROGRAM FOR TRANSMITTING REDUCED QUALITY IMAGES LINKED TO ORIGINAL QUALITY IMAGES

(75) Inventor: Yoko Fujiwara, Osaka (JP)

(73) Assignee: Minolta Co., Ltd., Osaka (JP)

( * ) Notice: Subject to any disclaimer, the term of this patent is extended or adjusted under 35 U.S.C. 154(b) by 701 days.

(21) Appl. No.: 10/094,664

(22) Filed: Mar. 12, 2002

(65) Prior Publication Data

US 2002/0133543 A1   Sep. 19, 2002

(30) Foreign Application Priority Data

Mar. 14, 2001   (JP)   ............... 2001-072655

(51) Int. Cl.
   *G06F 15/16*   (2006.01)
(52) U.S. Cl. .................................. 709/206
(58) Field of Classification Search ............... 709/201, 709/203, 205–207, 217, 219, 226, 229, 232, 709/233, 235; 358/1.15, 2.26
   See application file for complete search history.

(56) References Cited

U.S. PATENT DOCUMENTS

| | | | |
|---|---|---|---|
| 6,101,526 A | 8/2000 | Mochizuki | 709/200 |
| 6,275,829 B1 * | 8/2001 | Angiulo et al. | 707/104.1 |
| 6,350,066 B1 * | 2/2002 | Bobo, II | 709/206 |
| 6,469,797 B2 * | 10/2002 | Sakai | 358/1.15 |
| 6,493,105 B1 * | 12/2002 | Onuma | 358/1.15 |
| 6,564,321 B2 * | 5/2003 | Bobo, II | 713/168 |
| 6,574,670 B1 * | 6/2003 | Eguchi | 709/245 |
| 6,594,032 B1 * | 7/2003 | Hiroki et al. | 358/1.15 |
| 6,611,291 B1 * | 8/2003 | Dow et al. | 348/333.01 |
| 6,614,551 B1 * | 9/2003 | Peek | 358/1.15 |
| 6,633,913 B1 * | 10/2003 | Chalstrom et al. | 709/226 |
| 6,650,890 B1 * | 11/2003 | Irlam et al. | 455/412.1 |
| 6,665,838 B1 * | 12/2003 | Brown et al. | 715/501.1 |
| 6,693,652 B1 * | 2/2004 | Barrus et al. | 715/838 |
| 6,750,981 B1 * | 6/2004 | Kung et al. | 358/1.15 |
| 6,857,102 B1 * | 2/2005 | Bickmore et al. | 715/501.1 |
| 2002/0099829 A1 * | 7/2002 | Richards et al. | 709/227 |

FOREIGN PATENT DOCUMENTS

JP   10-40188   2/1998   ............... 12/54

* cited by examiner

*Primary Examiner*—William Vaughn
*Assistant Examiner*—Yemane M Gerezgiher
(74) *Attorney, Agent, or Firm*—Morrison & Foerster LLP

(57) ABSTRACT

The scanner 10 having a function as a data transmission device generates a reduced image 202 from the original image data obtained by scanning a document, prepares an e-mail 200 that contains the reduced image 202, which is linked to the original image data file stored in a specified storage area, and transmits the e-mail 200 to a specified destination.

5 Claims, 5 Drawing Sheets

DEVICE, METHOD, AND PROGRAM FOR TRANSMITTING REDUCED QUALITY IMAGES LINKED TO ORIGINAL QUALITY IMAGES

This application is based on Japanese Patent Application No. 2001-72655 filed on Mar. 14, 2001, the contents of which are hereby incorporated by reference.

BACKGROUND OF THE INVENTION

1. Field of the Invention

The present invention relates to a device, a method, and a program for transmitting image data via a network, as well as a computer readable recording medium stored with said program.

2. Description of the Related Art

With the popularization of various information equipment such as personal computers (hereinafter simply called "computers") and portable terminals, the amount of information each person is receiving or monitoring is increasing year by year. At the same time, the format of information is shifting from information on paper to electronic data, and the methods of information delivery such as circulation, distribution and display are being replaced by electronic data means.

For example, a method of distributing to each user an electronic data obtained by scanning a paper document by a scanner by attaching it to an electronic mail (e-mail) is well known. However, such an electronic data obtained by scanning a document is essentially an image data so that it has generally a very large volume. As a result, an electronic data, which is an image data obtained by scanning a document, tends to cause a problem that such an electronic data requires not only a long time to process but also a large storage capacity to store. For example, when an e-mail attached with an image data file, which typically has a large volume, is transmitted, it requires a long time for transmission and heavily tasks the mail server that stores it from the capacity standpoint. Moreover, if the mail server has a limitation for the data size of e-mail in order to alleviate its capacity load, there is a chance that it may reject transmitted e-mail.

In order to solve this problem, Unexamined Publication No. JP-A-10-233860 (corresponding to U.S. Pat. No. 6,101, 526) discloses a method that stores such an image data at a database server and simultaneously notifies the user on the e-mail that the image data is stored including the URL (Uniform Resource Locator) that indicates the location of said image data. This method enables the user to download the image data based on the URL to display or store on the user's computer as needed.

However, the prior art disclosed by above-mentioned publication had a shortcoming that an e-mail notifying the storage of the image data provides only limited amount information to the user concerning the contents of the image data. In other words, although such an e-mail notifying the storage of the image data includes information such as the sender's comment, transmitting source location and transmitting date, etc., the only information it carries concerning the image data is the URL that indicates the location of the storage. Therefore, the only way available for the e-mail's receiver to confirm the contents of the image data was to download the image data based on the URL. Therefore, the problem that unnecessary image data is transmitted to the destination consuming a lot of data transmission time and data storage volume at the destination was essentially left unsolved.

SUMMARY OF THE INVENTION

It is an object of the present invention is to provide a data transmission device, method, program, and a computer readable recording medium that stores the program, which are improved for solving the above-mentioned problems.

It is a further object of the present invention to provide a data transmission device, method, program, and computer readable recording medium that stores the program, with which it is possible for the receiver of an e-mail that notifies the storage of an image data to check the contents of said image data using a small amount of data and obtain the location information of said image data from the e-mail notifying the storage of the image data.

According to an aspect of the invention, it provides a data transmission device for transmitting image data via a network, comprising: a scanning device for scanning a document to obtain image data; a reduced image generating portion for generating, from the image data obtained by the scanning device, a reduced image that is smaller in size and has smaller volume than the image data when displayed as output image; a link forming portion for linking the reduced image to the image data by providing information indicating a location of the image data; a mail preparing portion for preparing an e-mail that contains the reduced image linked to the image data; and a mail transmitting portion for transmitting the e-mail containing the reduced image to a specified destination.

Thus, it is possible for the receiver of the e-mail that notifies the storage of an image data to check the contents of the image data using a small amount of data and instantaneously decides from the e-mail whether it is necessary to acquire detailed information of the image data. Consequently, it is possible to prevent an unnecessary image data from being transmitted to the destination and prevent the data transmission time and the data storage volume at the destination from wasted. Moreover, the reduced image can be used as a link button linked to the image data thus enabling the destination user to download only necessary image data to be displayed or stored on the user's computer.

According to another aspect of the invention, it provides a data transmission method for transmitting image data via a network, comprising the steps of: scanning a document to obtain image data; generating, from the obtained image data, a reduced image that is smaller in size and has smaller volume than the image data when displayed as output image; linking the reduced image to the image data by providing information indicating a location of the image data; preparing an e-mail that contains the reduced image linked to the image data; and transmitting the e-mail containing the reduced image to a specified destination.

According to still another aspect of the invention, it provides a data transmission program for transmitting image data via a network, the data transmission program causing a computer to execute a process comprising the steps of: scanning a document to obtain image data; generating, from the obtained image data, a reduced image that is smaller in size and has smaller volume than the image data when displayed as output image; linking the reduced image to the image data by providing information indicating a location of the image data; preparing an e-mail that contains the reduced image linked to the image data; and transmitting the e-mail containing the reduced image to a specified destination.

According to a further aspect of the invention, it provides a computer readable recording medium storing a data transmission program for transmitting image data via a network, the data transmission program causing a computer to execute a process comprising the steps of: scanning a document to obtain image data; generating, from the obtained image data, a reduced image that is smaller in size and has smaller volume than the image data when displayed as output image; linking the reduced image to the image data by providing information indicating a location of the image data; preparing an e-mail that contains the reduced image linked to the image data; and transmitting the e-mail containing the reduced image to a specified destination. According to a still further aspect of the invention, it provides a data transmission method for transmitting image data via a network, comprising the steps of: scanning a document to obtain image data; storing the obtained image data into a specified recording medium as a first image data and converting the image data to a second image data with a number of pixels smaller than that of the obtained image data; preparing an e-mail that contains information indicating the first image data's storage location and the second image data; and transmitting the prepared e-mail to a specified destination.

The objects, features, and characteristics of this invention other than those set forth above will become apparent from the description given herein below with reference to preferred embodiment illustrated in the accompanying drawings.

DETAILED DESCRIPTION OF THE PREFERRED EMBODIMENT

The embodiment of this invention will be described below with reference to the accompanying drawings.

Figure 1:
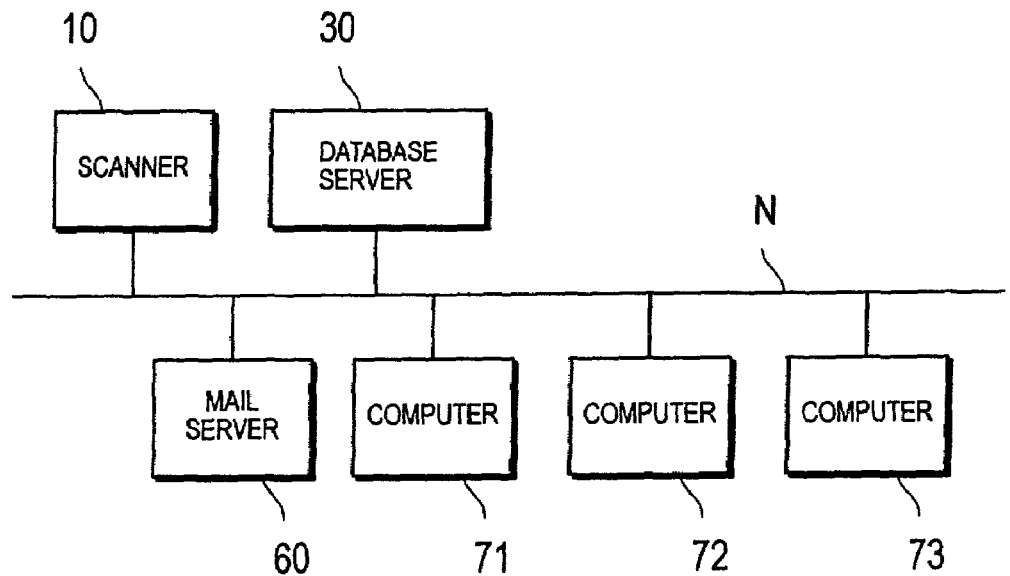
FIG. 1 is a diagram showing the constitution of a data distribution system including a data transmission device according to an embodiment of the present invention.

FIG. 1 is a diagram showing the constitution of a data distribution system including a data transmission device according to an embodiment of the present invention.

The data distribution system shown in FIG. 1 includes a scanner 10 that serves as a data transmission device, a database server 30, a mail server 60, and computers 71 through 73, and these devices are interconnected via a network N. The type and number of units of these devices on the network N are not limited to those shown in FIG. 1.

The network N can be a LAN such as the EthernetR, Token Ring, and FDDI (fiber distributed data interface), or a WAN consisting interconnected LANs.

Let us describe about the constitutions of these devices.

Figure 2:
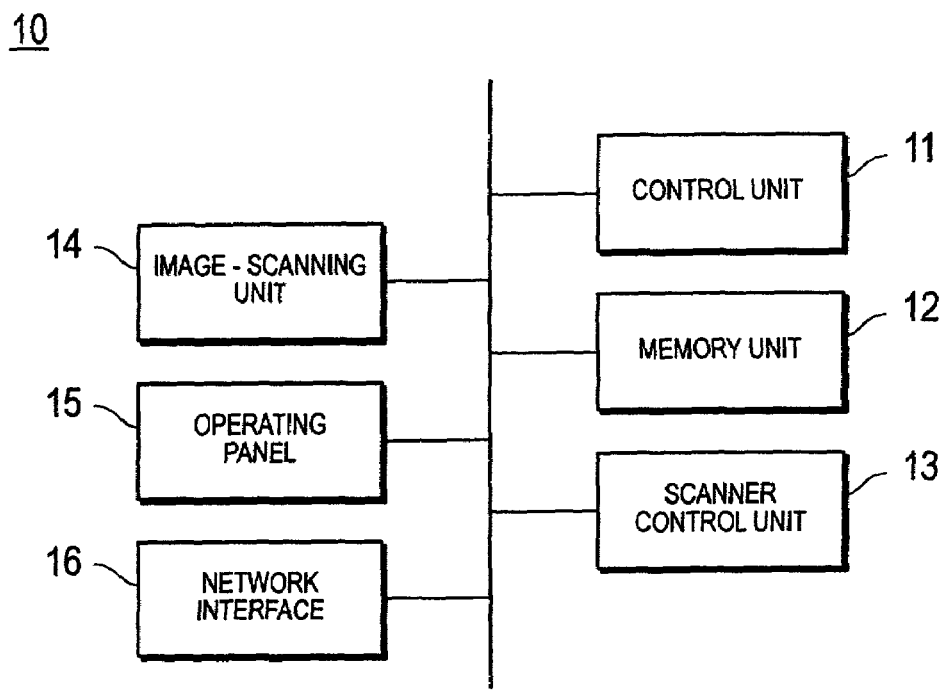
FIG. 2 is a block diagram showing an example constitution of a scanner.

FIG. 2 is a block diagram of an example constitution of the scanner.

As shown in FIG. 2, the scanner 10 has a control unit 11, a memory unit 12, a scanner control unit 13, an image-scanning unit 14, an operating panel 15, and a network interface 16.

The control unit 11 is in charge of executing the program, performing arithmetic operation, controlling various units, etc. The memory unit 12 stores the program and various data such as image data and stores data temporarily as a working area for executing various processes. The memory unit 12 includes, for example, a stationary memory and a hard disk.

The scanner control unit 13 is in charge of controlling various processes such as scanning of documents and image processing. The image-scanning unit 14 obtains image data by scanning documents. The image data outputted from the image-scanning unit 14 is temporarily written into the memory and then transferred from the memory to the hard disk normally after completing one page of scanning to be stored in it.

The operating panel 15 includes an operating unit for the user to perform various operations and instructions, and a display unit for various displays.

The network interface 16 is an interface for the scanner 10 to communication with various devices via the network N.

Figure 3:
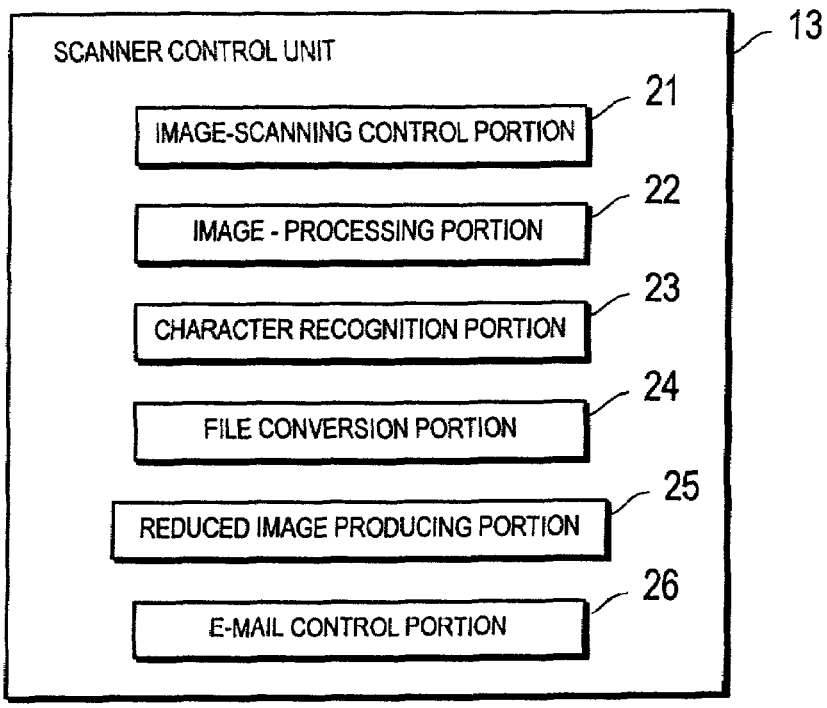
FIG. 3 is a diagram showing an example constitution of the scanner control unit.

As shown in FIG. 3, the scanner control unit 13 includes an image-scanning control portion 21, an image-processing portion 22, a character recognition portion 23, a file conversion portion 24, a reduced image producing portion 25, and an e-mail control portion 26. Each of these portions can be operated by means of a computer program, or can be realized by a dedicated hardware.

The image-scanning control portion 21 is in charge of controlling various processes such as the instruction for document scanning operation, storing the obtained image data to the memory unit 12, etc. The image-processing portion 22 is in charge of scaling, area separation, image correction, compression, etc., of the image data. The area separation means to separate the image data into character areas where character images exist, photographic areas where photographic images exist, etc.

The character recognition portion 23 recognizes character codes from character images of the image data. The file conversion portion 24 produces files of specific formats based on image data obtained by reading the document.

The reduced image producing portion 25 produces from the digital type image data (called original image data) obtained from the image-scanning unit 14 a reduced image (thumbnail image) of smaller display size and volume, hence of smaller resolution, than the original image data as output image. The number of pixels of a reduced image is smaller than the number of pixels of the original digital image data. The electronic mail control portion 26 is in charge of producing e-mail and controlling the exchange of e-mail between it and the mail server 60.

Figure 4:
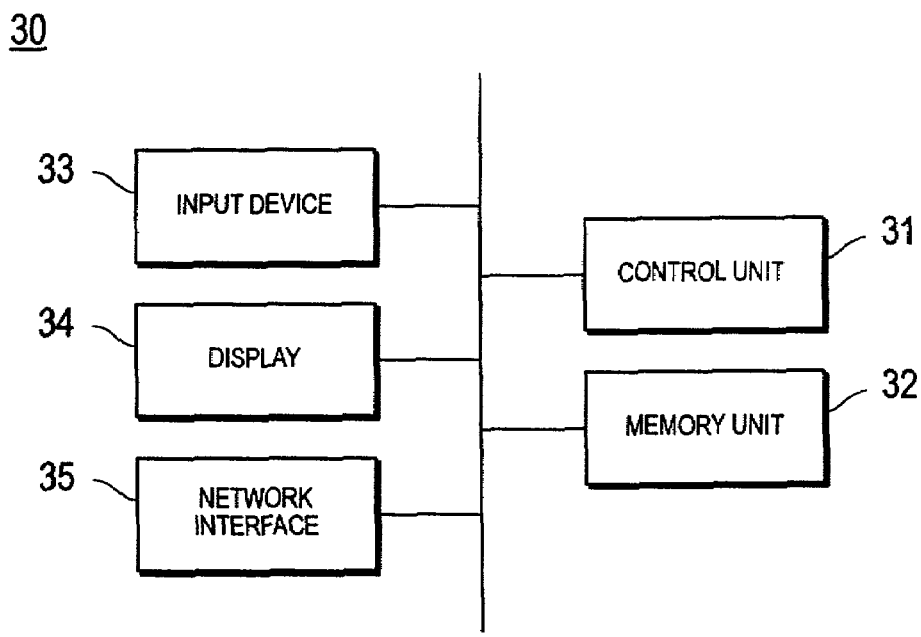
FIG. 4 is a block diagram showing an example constitution of a database server.

FIG. 4 is a block diagram showing an example constitution of the database server.

In FIG. 4, the data base server 30 has a control unit 31, a memory unit 32, an input device 33, a display 34, and a network interface 35.

The control unit 31 is in charge of executing the program, arithmetic operations, and controlling various units, etc. The memory unit 32 stores various data such as the program and image data and temporarily stores data as a working area for executing various processes. The memory unit 32 includes, for example, a stationary memory and a hard disk.

The input device 33 is a device for the user to perform various operations and instructions, and specifically includes a keyboard, a mouse, etc. The display 34 is for displaying information. The network interface 35 is an interface for the database server 30 to communicate with other equipment via the network N.

The mail server 60 has a control unit, a memory unit, and a network interface (not shown), and the functions of those units are identical to those of the corresponding units of the database server 30. However, the mail server 60 can be equipped further with an input device and a display.

This mail server 60 controls the sending and receiving of e-mail in the distribution system shown in FIG. 1, for example, to receive an e-mail and store it in the destination's mailbox in the memory unit of the mail server 60.

The computers 71 through 73 are each equipped with a control unit, a memory unit, an input device, a display, and a network interface (not shown), and the functions of those units are identical to those of the corresponding units of the database server 30.

Figure 5:
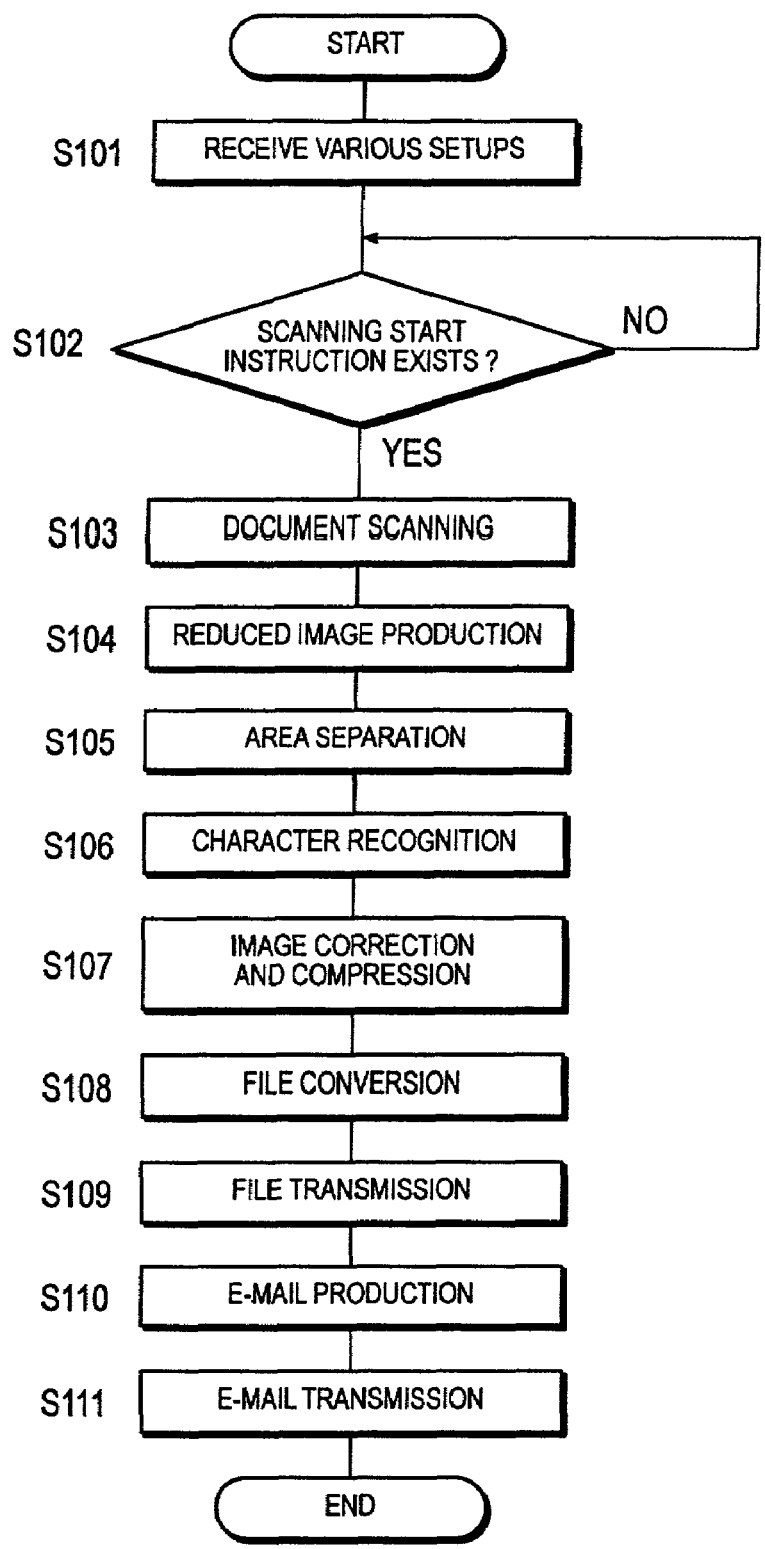
FIG. 5 is a flowchart showing the steps of the data transmission process on the scanner.

Let us now describe the steps of the data transmission process on the scanner 10 referring to FIG. 5.

In the step S101, the scanner 10 receives various setup inputs from the user via the operating panel 15. In other words, the user can set up using the operating panel 15 various items such as scanning condition for document scanning, data transmission information and scanning data information.

The scanning condition includes scanning resolution, color/monochromatic selection, scaling factor, and scan size. The data transmission information includes transmission destination, types of equipment at the transmission destination (e.g., computer, cellular phone, PDA, etc.), transmission timing, comments to be written into e-mail, and selection instruction whether to attach an image data directly to an e-mail or to include a link button that contains information indicating the location of the image data, as described later. The scan data information includes the name of the e-mail's sender, the file name when an image data is registered in the database server 30, the file's storage period, and the confidentiality level. The case of including the link button in the e-mail will be described in the following.

In the step S102, the scanner 10 stands by until the scanning start instruction is received from the user via the operating panel 15; upon receiving the scanning instruction, the process of the step S103 is executed.

Figure 6:
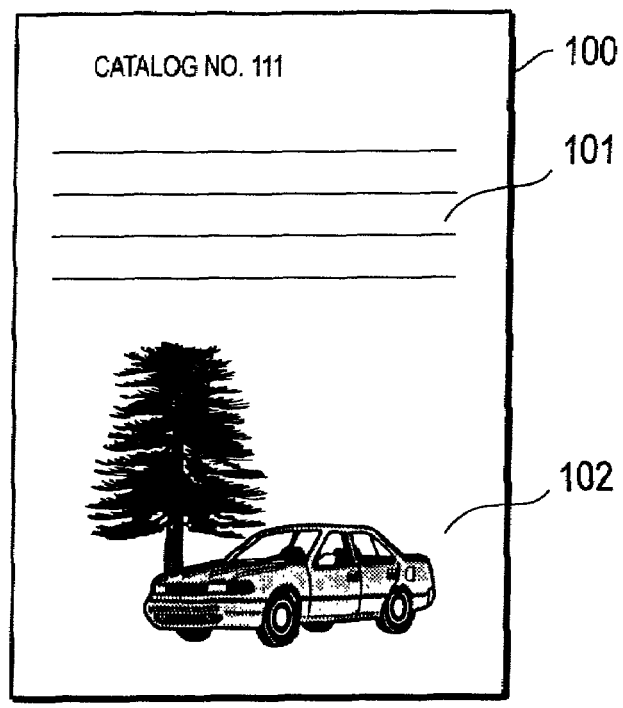
FIG. 6 shows an example document.

In the step S103, the document scanning is performed. As shown in FIG. 6, a document 100 consists of, for example, a character section 101 where characters exist and a photographic section 102 where photographs exist.

The scanning process starts when the user operates the start key of the operating panel 15 and image data is obtained by means of the image-scanning unit 14 as the document placed at a specified location of the scanner 10 is scanned. The image data thus obtained will be stored in the memory unit 12 as a digital image data of a specified format, e.g., the bitmap format.

In the step S104, the reduced image producing portion 25 produces a reduced image smaller in size (resolution) than the original image data obtained by scanning the document. The reduced image thus produced will be stored in the memory unit 12. The production of the reduced image in this step S104 can be executed at any time as long as it is in prior to the production of the e-mail in the step S110 to be described later.

The volume (size, resolution) of the reduced image is set according to the e-mail's destination, or, more specifically, the type of equipment at the destination. For example, the volume of the reduced image is normally set to the default value corresponding to a case when the transmission destination is a computer. If the equipment is a cellular phone, a PDA, etc., whose capacity for display or memory is smaller, the volume of the reduced image will be made further smaller, in other words, the image data will be further reduced. When transmitting an image data to multiple kinds of equipment, it is possible to produce several kinds of reduced image. Moreover, for a single destination, it is possible to produce one kind of reduced image or multiple kinds of reduced images with different resolutions.

Except in the case of calling for the first time, the transmission destination is normally stored in the address book controlled by the e-mail control portion 26. Therefore, it is preferable to store the type of equipment available at the particular destination in the destination's data in the address book. Doing so will eliminates the necessity to set up the type of equipment for a destination each time the user calls the destination.

In the step S105, the image-processing portion 22 performs the area separation process to the image data obtained by scanning the document. The image data is separated into various areas such as the character area and the photographic area. Moreover, image correction processes, such as edge intensification, smoothing, etc., are performed in accordance with each attribute of the areas.

In the step S106, the character recognition portion 23 recognizes character codes for character images in the character area. Moreover, character code data is generated for the recognized character codes. The generation of character code data in the step S106 is not always done in the invention. If the character code data is not generated, the process using the character code data to be described below is omitted.

In the step S107, after an appropriate image correction process, the image data obtained by scanning the document is compressed according to the JPEG format, etc., by means of the image-processing portion 22. The image compression process can be omitted.

In the step S108, after being treated with the image correction process and the compression process, the image data is converted by the file conversion portion 24 into, for example, a PDF (Portable Document Format) file. The file is then stored into the memory unit 12 temporarily.

On the other hand, the character code data is stored separately in the memory unit 12 under a file name that corresponds with the file name of the above-mentioned image data. In this case, it is preferable to make the character code data related to the image data related so that the character code data can be referenced from the image data. However, the character code data can be contained in the PDF file of the image data in a format that is not displayed as an output image.

The image data file contains all the images in all the areas including the character area and the photographic area. However, the character images in the character area can be replaced with character code data. In this case, the produced file contains the character code data and the image data only within the photographic area. Therefore, the size (volume) of the file becomes more compact, which makes the data processing time shorter and reduces the storage capacity requirement for storing the data.

In the step S109, the file for the produced image data and the file for the produced character code data are transmitted to the data base server 30 for common data. The transmission to the database server 30 is performed in accordance with the specific transfer protocol without going through the mail server 60. The file is stored in the specified directory on the hard disk of the memory unit 32 of the database server 30.

As described later, in order to download the image data from the database server 30, it is necessary to have the IP address or domain name of the database server 30 as well as a file storage place for the image data in the database server 30. Therefore, the URL that indicates the location of the image data transmitted to and stored at the database 30 is stored in the memory unit 12.

In the step S110, an e-mail is prepared by the e-mail control portion 26 to notify the destination specified by the step S101 of the fact that the image data is stored in the database server 30.

The e-mail mentioned here contains the reduced image produced in the step S104 as a link button that contains the information that indicates the location of the image data. In other words, the reduced image is related to the particular image data by having information that indicates the location of the image data. The e-mail is written in a format such as the HTML (Hyper Text Markup Language) or the XML (extensible markup language) in order to have the linking function. The computer of the recipient of the prepared e-mail must have a display capability corresponding to HTML or XML files, etc. However, since such software is widely used, no special software is needed.

Figure 7:
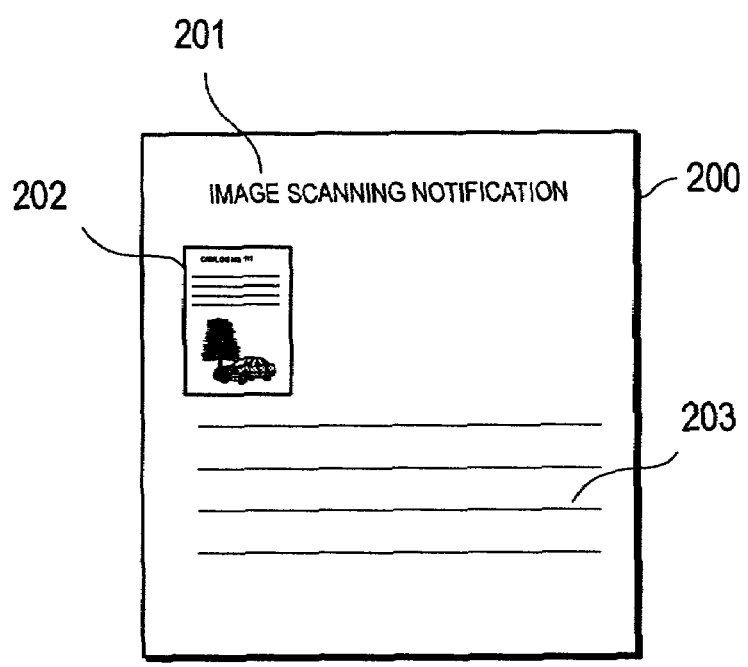
FIG. 7 shows an example e-mail.

The e-mail is prepared as follows. First, as shown in FIG. 7, a comment 201 is written in the e-mail 200 if such a comment entered by the user exists. Next, a reduced image 202 related to the image data is placed as the link button. Then, a character code data 203 is written. The e-mail also includes various kinds of information such as the transmitter, the destination and the transmission date and time although they are not shown in the drawing.

The character code data 203 written in the e-mail is prepared based on the character code data prepared in the step S106. The number of characters of the character code data 203 is set up in accordance with the destination of the e-mail, more specifically, the type of the destination's equipment similar to the reduced image. For example, the number of the characters included in the character code data 203 is normally set to the default value corresponding to a case when the transmission destination is a computer. If the equipment is a cellular phone, a PDA, etc., whose capacity for display or memory is smaller, the number of characters to be included in the character code 203 will be made further reduced. When transmitting the data to multiple kinds of equipment, it is possible to produce several kinds of character code data 203. Moreover, the character code data 203 can have a data truncated in the middle because of the limitation on the number of characters allowed, or can include an extracted attributive part such as a heading.

The reduced image 202 included in the e-mail 200 is described in the HTML file as follows: <A HREF="(URL of the image data file)"><IMG SRC="(reduced image's file name)"></A>

Therefore, when the destination user clicks the reduced image 202, the URL that indicates the location of the file stored in the data base server 30 is referenced due to the linking function.

Although the description states that it will jump to the link site, which is indicated in the URL, when the reduced image displayed there is clicked in the above case, it is also possible to display the URL separately on the side or below the reduced image. In this case, it is preferable to arrange to jump to the image's storage site when either the reduced image or the URL is clicked.

While the image data is stored as a PDF file in the database server 30 as mentioned before, the display software for downloading and displaying this PDF file is widely used as the plug-in software for Web browsers, so that no special software is required. However, the file format for the image data to be stored in the database server 30 is not limited to PDF. For example, it is possible to store the image data in a file format such as TIFF (Tagged Image File Format), etc., arrange the particular HTML file in the URL referenced by the reduced image 202, and include in the HTML file a description that references the TIFF file of the image data.

In the step S111, the e-mail control portion 26 transmits the e-mail prepared in the step S110 to the destination specified in the step S101. This e-mail is stored in the mailbox of the destination of the e-mail at the mail server 60.

Figure 8:
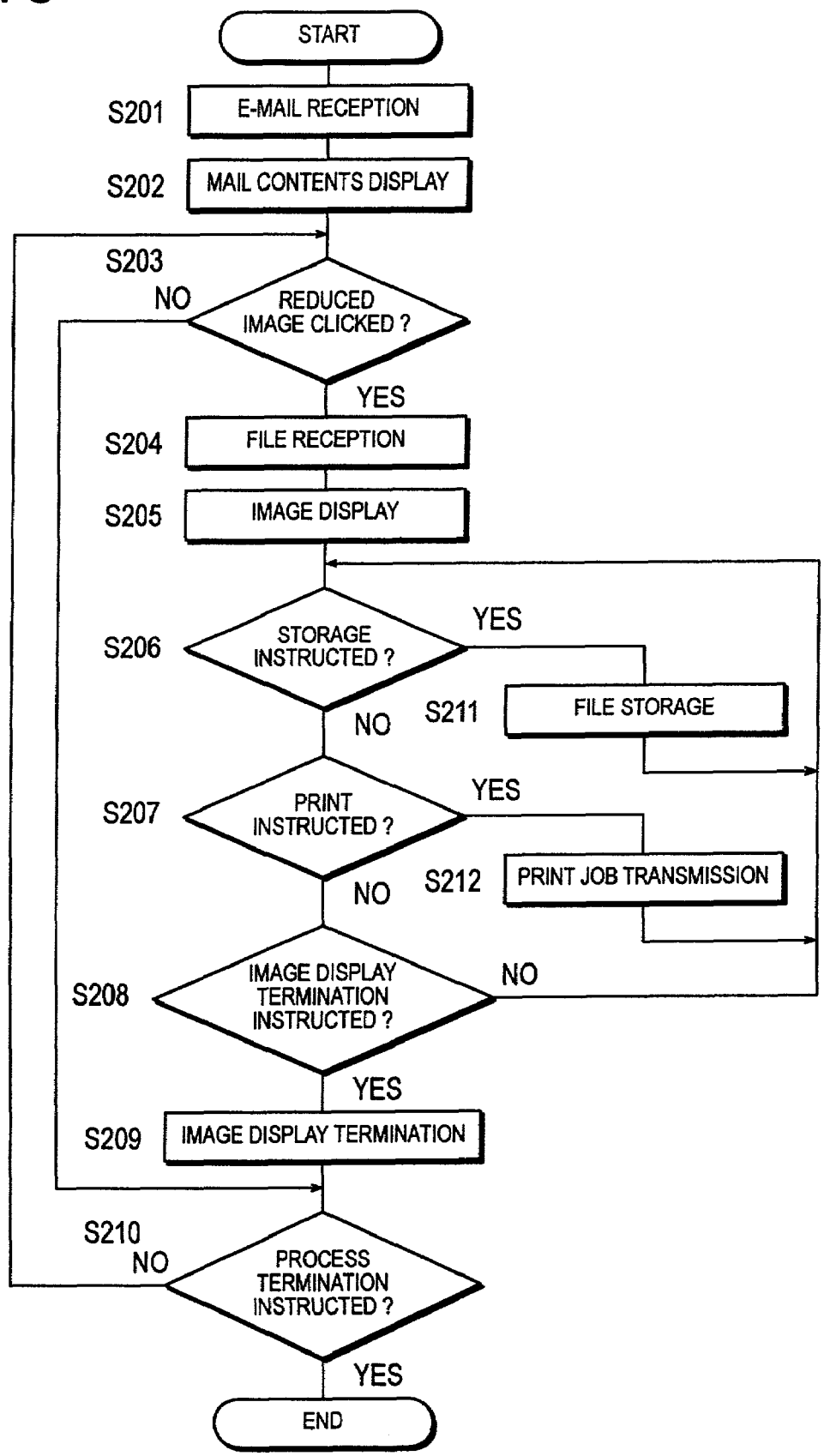
FIG. 8 is a flowchart showing the steps of the data reception process on the computer.

Next, the steps of data reception process at the computers 71 through 73 will be described with reference to FIG. 8.

First, in the step S201, when the user of the computer 71 accesses the mail server 60, for example, an e-mail transmitted by the scanner 10 will be received. In the step S202, the contents of the received e-mail 200 are displayed. Consequently, the output image of the reduced image 202 contained in the e-mail 200 on the display makes it easier for the user to understand the outline contents of the image data stored in the database server 30. The output image on the display based on the character code data 203 makes it even easier for the user to understand the outline contents of the image data.

In the step S203, a judgment is made whether the reduced image 202 outputted on the display is clicked by the user. When the reduced image 202 is clicked (step S203: Yes), the process of the step S204 will be executed; if the reduced image 202 is not clicked (step S203: No), the operation proceeds to the process of the step S210.

In the step S204, the image data file linked to the reduced image 202 is downloaded from the database server 30. At this time, the database server 30 transmits the image data related to the reduced image 202 to the computer according to the transfer protocol without going through the mail server 60 based on the link function when the user clicks the reduced image 202 outputted on the computer display.

In the step S205, the received image data will be displayed.

In the step S206, a judgment is made whether there was an instruction to store the image data. If there was an instruction for storing the image data (step S206: yes), the image data file will be stored in the memory unit (step S211), and the operation returns to the process of the step S206.

In the step S207, a judgment is made whether there was an instruction to print the image data. If there was an instruction for printing the image data (step S207: yes), the print job for printing the image data will be transmitted to a printer (not shown) (step S212), and the operation returns to the process of the step S206. Either the step S206 or the step S207 can be executed ahead of the other.

In the step S208, a judgment is made whether there was an instruction to terminate the display of the received image data. If there was an instruction for terminating the display of the image data (step S208: Yes), the operation proceeds to the process of the step S209. If there was no instruction for terminating the display of the image data (step S208: No), the processes of the steps S206 through S208 will be repeated.

In the step S209, the display of the received imaged data is terminated.

In the step S210, a judgment is made whether there was an instruction to terminate the display of the data receiving process. If there was an instruction for terminating the data receiving process (step S209: Yes), the data receiving process is terminated. If there was no instruction for terminating the data receiving process (step S209: No), the operation returns to the process of the step S203.

Thus, according to this embodiment, the scanner 10 generates the reduced image 202 from the image data obtained by scanning a document, prepares the e-mail 200 that contains the reduced image 202, which is linked to the original image data file, and transmits it to the specified destination.

Therefore, it is possible for the receiver of the e-mail 200 that notifies the storage of an image data to check the contents of the image data using a small amount of data and instantaneously decides from the e-mail 200 whether it is necessary to acquire detailed information of the image data. Consequently, it is possible to prevent an unnecessary image data from being transmitted to the destination and prevent the data transmission time and the data storage volume at the destination from wasted.

Moreover, since the reduced image 202 can be used as a link button linked to the particular image data, the destination user can download only the necessary image data to be displayed or stored on the user's computer by simply clicking the reduced image 202.

The invention is not limited to the embodiments described above, but rather can be modified in various ways within the scope of the claims.

For example, although the scanner 10 and the database server 30 are constituted separately and connected via the network, the invention is not limited to such a scheme. The invention can be applied to a network scanner wherein the scanner 10 and the data server 30 are constituted integrally, or to a digital compound machine with multiple functions such as the ones called MFP (Multiple-Function Peripheral) capable of printing. In such a case, the network scanner or MFP is preferable to have a memory unit for storing data of large volumes.

Although it was described in the above embodiment that one computer is used to receive the data, the invention is not limited to such a scheme, but also can be constituted to download the image data to a device different from the e-mail receiving device. In this case, for example, it is possible to have an HTML file at the URL being referenced by the reduced image and have the description for referencing the image data file and the description for requesting the destination of the image data in the HTML file. Thus, the e-mail can be received by equipment such as a cellular phone or a PDA and the image data can be downloaded from the database server 30 to other equipment such as a computer.

Various means of controlling and arithmetic operations in the data transmission device as well as data transmission method according to this invention can be realized either by a dedicated hardware circuit or a programmed computer. In realizing the present invention with a programmed computer, the program for operating the computer can be provided in computer readable recording media (e.g., flexible disks and CD-ROMs). In such a case, the program recorded on a computer readable medium is normally transferred to and recorded on a hard disk. This program can be provided, for example, independently as application software, or can be built into the software of the computer as a part of the computer's function.

What is claimed is:

1. A data transmission device for transmitting image data via a network, comprising:
    a scanning device to scan a document to obtain image data;
    a reduced image generating portion to generate, from the image data obtained by said scanning device, a reduced image that is smaller in storage size and has a smaller display size than said image data when displayed as output image;
    a link forming portion to link said reduced image to said image data by providing information indicating a location of said image data;
    a character recognition portion to recognize character codes from the image data obtained by said scanning device,
    a mail preparing portion to prepare an e-mail that contains said reduced image linked to said image data and a character code data corresponding to character codes recognized from said image data;
    a mail transmitting portion to transmit the e-mail to a specified destination and a volume setting portion to set a volume of said reduced image contained in said e-mail according to an equipment type of said destination;
    wherein the scanning device comprises a memory to store the image data and the reduced image prior to transmitting the e-mail containing the reduced image.

2. A data transmission device as claimed in claim 1, further comprising:
    an external memory device, external from the scanning device, to store the image data obtained by said scanning device,
    wherein said reduced image is linked to said image data stored in said external memory device.

3. A data transmission device as claimed in claim 1, further comprising:
    a character number setting portion to set a number of characters for character code data contained in said e-mail in accordance with the type of equipment at said destination.

4. A data transmission method for transmitting image data via a network, the method comprising:
    obtaining a document containing image data using a scanner comprising a memory;
    generating, from the image data, a reduced image that is smaller in storage size and has a smaller display size than said image data when displayed as output image;
    recognizing character codes from the image data obtained by said scanning device;
    generating character code data corresponding to character codes recognized from said image data;
    storing the image data and the reduced image in the memory;
    linking said reduced image to said image data by providing information indicating a location of said image data;
    preparing an e-mail that contains said reduced image linked to said image data and the character code data corresponding to character codes recognized from said image data; setting a volume of said reduced image contained in said e-mail according to an equipment type of a specified destination and
    transmitting the e-mail to said specified destination,
    wherein the image data and the reduced image are stored in the memory before the preparing of the e-mail.

5. A computer readable recording medium to store a data transmission program for transmitting image data via a network, said data transmission program causing a computer to execute a process comprising:

obtaining a document containing image data using a scanner comprising a memory;

generating, from the image data, a reduced image that is smaller in storage size and has a smaller display size than said image data when displayed as output image;

recognizing character codes from the image data obtained by said scanning device;

generating character code data corresponding to character codes recognized from said image data;

storing the image data and the reduced image in the memory;

linking said reduced image to said image data by providing information indicating a location of said image data;

preparing an e-mail that contains said reduced image linked to said image data and the character code data corresponding to character codes recognized from said image data; setting a volume of said reduced image contained in said e-mail according to an equipment type of a specified destination and transmitting the e-mail to said specified destination wherein the image data and the reduced image are stored in the memory before the preparing of the e-mail.

* * * * *